US006146723A

United States Patent [19]

Arends

[11] Patent Number: 6,146,723

[45] Date of Patent: Nov. 14, 2000

[54] ENHANCED GEM STONE AND A METHOD OF SIMULATING THE APPEARANCE OF AN EXPENSIVE GEM STONE

[75] Inventor: Ronald W. Arends, Randolph, N.J.

[73] Assignee: Fitness Innovations & Technologies (F.I.T.) Inc., Chester, N.J.

[21] Appl. No.: 09/373,821

[22] Filed: Aug. 13, 1999

Related U.S. Application Data

[62] Division of application No. 08/884,730, Jun. 30, 1997, Pat. No. 5,981,003.

[51] Int. Cl.[7] .............................. A01N 1/00; A01N 3/00; A41G 3/00; A41G 5/00; B44F 7/00

[52] U.S. Cl. ............................ 428/15; 427/445; 427/260; 63/32

[58] Field of Search ............................ 428/15, 28, 913.3; 63/32; 206/575; 427/164, 162, 445, 429, 260; 29/896.4, 896.41

[56] References Cited

U.S. PATENT DOCUMENTS 3,785,912 1/1974 Van Deusen .
5,423,714 6/1995 Lach .
5,853,826 12/1998 Starcke et al. .

OTHER PUBLICATIONS pp. 853 and 143 of Meriam–Webster's Collegiate Dictionary–10th edition.

*Primary Examiner*—Deborah Jones
*Assistant Examiner*—Wendy Boss
*Attorney, Agent, or Firm*—Francis C. Hand, Esq.; Carella, Byrne, Bain, Gilfillan, Cecchi, Stewart & Olstein

[57] ABSTRACT

A clear crystalline faceted substrate is provided with a coating of a colored transparent ink in order to enhance the appearance of the otherwise inexpensive gem stone. The ink is a permanent type ink made from n-propanol, n-butanol and diacetone alcohol which is soluble in a solution having a isopropyl alcohol 99% strength. Once the coating has been applied to a substrate such as a cubic zirconia to enhance the appearance of the gem stone, the coating can be removed by use of the solvent. A fresh coating of a different color may then be applied.

11 Claims, 1 Drawing Sheet

FIG. 1
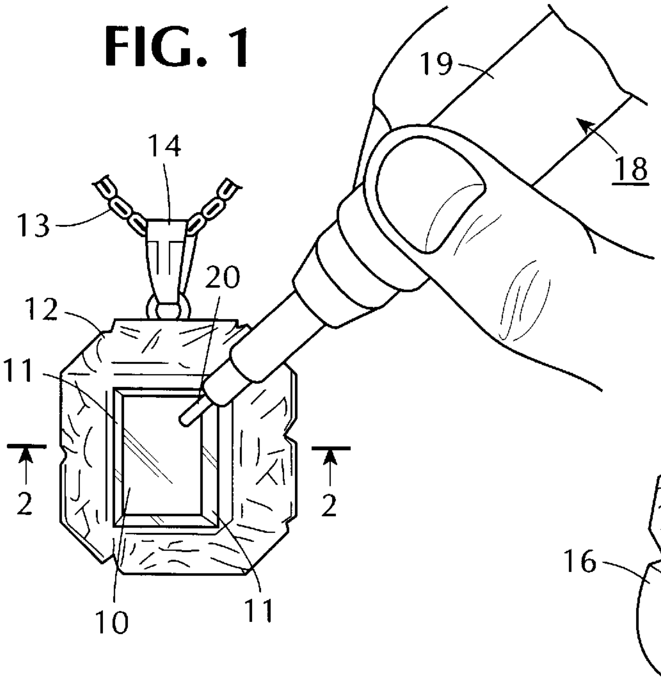
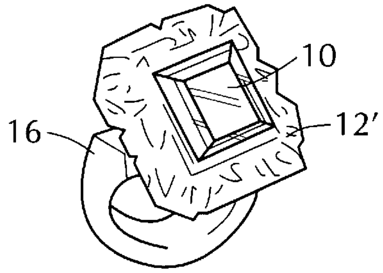
FIG. 4
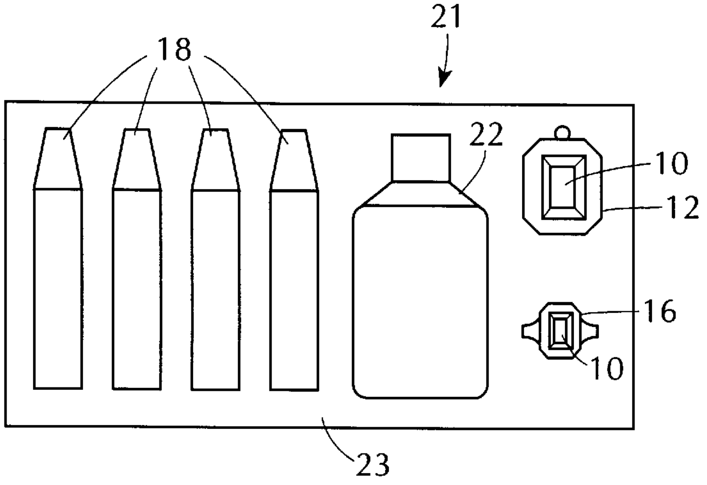
FIG. 5
FIG. 6
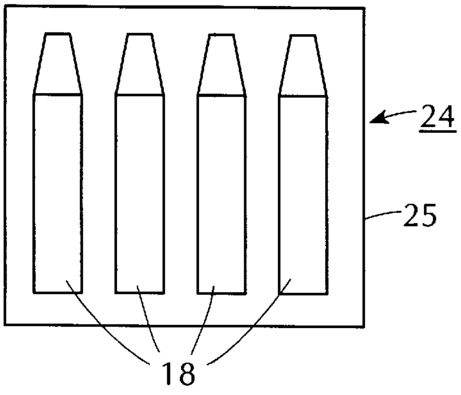
FIG. 2
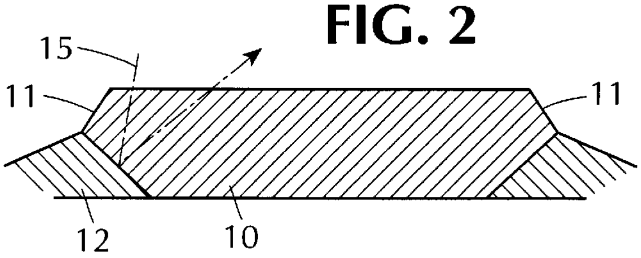
FIG. 3
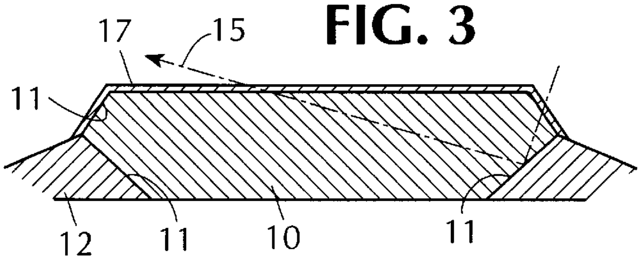

ENHANCED GEM STONE AND A METHOD OF SIMULATING THE APPEARANCE OF AN EXPENSIVE GEM STONE

This is a Division of application of Ser. No. 08/884,730, filed on Jun. 30, 1997 now U.S. Pat. No. 5,981,003.

This invention relates to an enhanced gem stone, a jewelry enhancement kit and a method of simulating the appearance of an expensive gem stone.

Heretofore, various attempts have been made to produce jewelry items of inexpensive materials with the appearance of expensive materials. For example, U.S. Pat. No. 1,005,564 describes a technique of employing colored sheets of celluloid to form various shapes to represent various natural materials and gems, such as coral, turquoise and the like. U.S. Pat. No. 4,295,347 describes other techniques employing lacquers on a substrate in order to simulate the appearance of a gem. U.S. Pat. No. 4,835,023 describes the use of various coatings on cultured pearls in order to improve the quality of the pearls.

Apart from the above, techniques have also been employed in making stained glass windows wherein a pane or ordinary glass is provided with a light transmissive glass tint or color in order to impart the appearance of total color to the glass, for example as described in U.S. Pat. No. 3,713,958.

To date, the techniques which have been employed to process an inexpensive material to give the appearance of an expensive material have been cumbersome, and, in some cases, have not achieved the desired result.

Accordingly, it is an object of the invention to provide a simple technique for enhancing the appearance of an inexpensive gem stone.

It is another object of the invention to impart the appearance of a precious gem stone to an inexpensive gem stone.

It is another object of the invention to impart the appearance of an emerald, ruby or sapphire to a clear cyrstalline gem stone, such as a cubic zirconia.

It is another object of the invention to be able to change the appearance of a base gem stone to any one of a selected number of different colors.

Briefly, the invention provides a technique whereby a jeweler may enhance the appearance of a clear crystalline substrate, such as an inexpensive faceted gem stone, to that of a precious gem stone, such as an emerald, ruby, sapphire or any other colored gem stone. In this respect, the jeweler is able to demonstrate, for example, to a prospective purchaser, the appearance of a precious gem stone or stones in a setting or arrangement without need to use a precious gem stone or stones in the demonstration.

Furthermore, the invention allows a color-enhanced gem stone to be changed back to its original state and enhanced with a different color. This allows the jeweler the opportunity of demonstrating different colors of precious gem stones in one or more settings or arrangements.

In accordance with the invention, a clear crystalline substrate having a plurality of facets thereon is provided with a coating of a permanent transparent coloring medium adhered to at least some of the facets to impart the appearance of a colored precious stone to the substrate.

Typically, the clear crystalline substrate is a gem stone selected from the group consisting of diamond, cubic zirconia and white sapphire.

The coating of transparent coloring medium is a permanent transparent ink, and, preferably, a transparent ink comprised of n-propanol, n-butanol and diacetone alcohol.

The transparent coating is of a predetermined color, for example, one of red, blue, green and yellow and is adhered to the faceted surface of the faceted gem stone so that natural light entering through the coating into the gem stone is colored, reflected around and inside the stone and then reflected back out from the stone in the predetermined color. For example, if the transparent coating is green, the gem stone has the appearance of an emerald. If the transparent coating is red, the gem stone has the appearance of a ruby, and if blue, the appearance of a sapphire. If the stone has a color, for example, if the stone is a yellow diamond, the color may be intensified by adding a yellow transparent coating.

In the event that the coating needs to be removed, for example, in order to apply a different colored coating, an alcohol solution is used to remove the coating. In this respect, the coating is soluble in a solution containing isopropyl alcohol. In order to ensure removal of the coating from comers or crevices, for example, in a setting in which the gem stone is placed, the isopropyl alcohol is 99% strength.

The invention employs an applicator for applying the transparent coating to the gem stone. For example, the applicator may have a barrel having a chamber defining a reservoir, a transparent coloring medium in the reservoir and a fine point tip mounted on the barrel and communicating with the reservoir in order to apply the coloring medium to a substrate. The use of a fine point tip allows the coloring material to be applied to relatively small areas on a gem stone, particularly in areas where the gem stone is held in a setting or the like.

The transparent coloring medium for the coating also includes a dye selected from the group consisting of red, blue, green, and yellow or any other suitable color corresponding to a precious gem stone and the like.

The invention also provides a jewelry enhancement kit which includes a plurality of applicators for applying a transparent coloring medium to a faceted surface of a gem stone in order to form a temporary coating thereon and to thereby simulate the appearance of a precious stone. In addition, the kit may include a container containing a solvent for removing a coating applied to a stone. Still further, the kit may be provided with one or more inexpensive faceted gem stones of different shapes and sizes in suitable settings.

The invention also provides a method of simulating the appearance of an expensive gem stone on a faceted substrate of clear crystalline material. In this respect, as a first step, a clear crystalline substrate having a plurality of facets for reflecting natural light passing into the substrate is first provided. Thereafter, a coating of a colored, permanent transparent ink is applied to a surface of the substrate. This coating is of a thickness to color natural light passing into the substrate whereby the colored light is then passed into the substrate, reflected and then passed out of the substrate to provide a visual appearance of a colored precious gem stone.

As above, the clear crystalline substrate may be a faceted gem stone selected from a group consisting of diamond, cubic zirconium and yellow sapphire or from any other suitable faceted stone. The colored permanent transparent ink may be of a color chosen from the group consisting of, but not limited to blue, red, green and yellow in order to impart the appearance of a sapphire, ruby, emerald or yellow diamond, respectively.

While the technique is particularly suitable for use by jewelers in the demonstration of jewelry, the technique may also be used by individuals. For example, a person may use a kit of applicators of different colors to color-enhance the appearance of one or more inexpensive gem stones, from time-to-time depending on the appearance desired. For example, a tennis bracelet of cubic zirconia stones may be colored to show sequences or alternating patterns of red, blue and green stones.

These and other objects and advantages of the invention will become more apparent from the following detailed description taken in conjunction with the accompany drawings wherein:

BRIEF DESCRIPTION OF THE DRAWINGS

FIG. 1 illustrates an applicator in accordance with the invention for applying a transparent coating to a faceted gem stone;

FIG. 2 illustrates a cross sectional view of the gem stone of FIG. 1 prior to an application of a transparent coating in accordance with the invention;

FIG. 3 illustrates a view similar to FIG. 2 with a transparent coating thereon in accordance with the invention;

FIG. 4 illustrates a gem stone coated with a transparent coating and mounted on a ring setting;

FIG. 5 illustrates a jewelry enhancement kit in accordance with the invention; and FIG. 6 illustrates a jewelry enhancement kit comprised of a plurality of applicators in accordance with the invention.

Referring to FIG. 1, a clear crystalline substrate, for example, a gem stone 10 having an exposed top faceted surface with a plurality of facets 11 is mounted in a suitable setting 12, for example, for use as a pendent suspended from a chain 13 or the like via a suitable connector 14. The facets 11 are disposed on the gem stone 10 to impart a brilliance thereto. For example, as indicated in FIG. 2, light rays 15 which pass into the gem stone 10 are reflected by the facets 11 and pass back out of the stone 10 in order to impart a brilliance to the stone.

The gem stone 10 may be made of any satiable natural clear crystalline materials, such as diamond, cubic zirconia and white sapphire. For the purposes described herein, the least expensive material should be selected, for example, a cubic zirconia.

The setting 12 may be of any suitable type. For example as indicated FIG. 4, wherein like reference characters indicate like parts as above, the gem stone 10 may be mounted in a setting 12' for a ring 16.

In accordance with the invention, a transparent coating 17 of a chosen color is applied to the faceted surface of the gem stone 10 whereby rays 15 of natural light entering through the coating 17 (see FIG. 3) into the stone 10 is colored and then reflected around and inside the stone 10 before being reflected out from the stone 10 in the chosen color. For example, where the coating 17 is green, green light is reflected back out of the stone 10 to provide the visual appearance that the stone is an emerald.

The transparent coating 17 is a transparent ink which can be applied by pen, by brush or by any suitable means. Depending on the size of the gem stone 10, the applicator may use a fine tip for small stones or a wide tip for large gem stones. For example, as shown in FIG. 1, an applicator 18 may have a barrel 19 which includes an interior chamber defining a reservoir (not shown) with a transparent coloring medium (not shown) in the reservoir. In addition, a fine point tip 20 is mounted on the end of the barrel 19 and communicates with the reservoir in order to transfer the coloring medium to the gem stone 10. A suitable cap (not shown) may also be mounted on the applicator 18 to protect the fine point tip 20 and to prevent inadvertent marking of an object with the ink.

Various types of transparent inks or coatings have been known for various marking purposes. Typically, use has been made of transparent inks in highlighting marking pens for the read-through marking of print-outs, books, reports and texts. However, these transparent inks are typically water soluble, and if applied to a substrate such as glass, can be readily removed from the glass. Marking inks have also been known for the marking of glass bottles for identification purposes. Typically, these inks are intended to be of a permanent nature.

The transparent ink which is used for the coating 17 is not water soluble and is of a nature so as to be permanently adhered to a substrate, such as a faceted gem stone, without rubbing off under the normal use of the gem stone as a piece of jewelry. In addition, the ink has a high evaporation rate so as to be quick drying. Such an ink is one which is found in a Sharple Fine Point Permanent Marker sold by the Sanford Corporation of Bellwood, Ill. Such an ink is described as being composed of a dye in n-propanol (71-23-8), n-butanol (71-36-3-) and diacetone alcohol (123-42-2). The ink also includes a suitable resin to impart adhesive properties to the ink to enable the ink to adhere to a substrate such as a gem stone. The physical/chemical characteristics for the n-propanol part of the ink is as follows:

For n-propanol
- Boiling Point: 207° F.
- Vapor Pressure (mmHg): 13 mmHg at 20° C.
- Specific Gravity: 0.8044 at 20/20° C. (water=1)
- Solubility in Water: Complete
- Appearance/Odor: Clear, colorless mobile liquid with mild alcohol odor
- Evaporation Rate: 1.3 (butyl acetate=1)

The transparent ink is made to be solvent in a solution containing isopropyl alcohol 99% strength. Lesser percentage alcohols may be used to remove the coating from a gem stone 10, however, lesser percentage alcohols tend not to remove the ink from corners or crevices. For example, a 70% solution can remove the coating 17 from major exposed surface with some light rubbing force but removal of the coating from corners or crevices is difficult.

The amount of ink which is applied to a gem stone 10 is sufficient to provide a coating to color the light rays 15 passing into the gem stone 10. By changing the shading of the ink, the shading of color which is imparted to the gem stone may also be changed. Likewise, by adding additional layers of ink, the intensity of the color can be made darker. Basically, the coating 17 is adhered to the gem stone 10 in a way that the stone which is otherwise inexpensive becomes a wearable piece of jewelry having the appearance of an expensive stone. The affect of applying the ink to the surface of the gem stone 10 is enhanced by the refractive properties of the stone being colored. The light rays 15 entering the stone 10 become colored and are reflected around and inside the stone 10 before being reflected back to the eye showing the stone in the chosen color.

In the event that a stone has been provided with a coating of one chosen color, the coating 17 may be removed by the alcohol solution so that a fresh coating of a different color can be applied to the gem stone.

Referring to FIG. 5, wherein like reference characters indicate like parts as above, a jewelry enhancement kit 21 may be provided, for example for retail sales to a consumer. In such a case, the kit 21 includes a plurality of applicators 18, for example four applicators 18 each containing an ink of a different color from the other. By way of example, the applicators may be filled with red ink, blue ink, green ink and yellow ink, respectively. In addition, a container 22 of solvent is provided in order to permit removal of the inks from a gem stone.

From time-to-time, a user may use one of the color-enhancing applicators 18 to color an inexpensive gem stone for example with the color green to have the stone appear as an emerald. Thereafter, the user can remove the color coating from the stone using the solvent in the container 22 and then apply another color, for example, red using another applicator 18 in the kit to have the stone appear as a ruby.

Simply stated, the color of the base gem stone may be changed at any time in a relatively simple manner. Thus, a person need not have separate sets of emeralds, rubies and sapphires but rather need only have one set of inexpensive gem stones and a kit 21 with color. Enhancing applicators of different colors.

The kit 21 may also be provided with clear crystalline gem stones, for example of cubic zirconium so that the user can apply the appropriate ink to the occasion in order to provide a matching set of jewelry pieces.

The kit 21 may also use a suitable housing 23 in order to package the applicators 18, container 22 and stones 10, 16 in an attractive appearance.

Referring to FIG. 6, a jewelry enhancement kit 23 may consist solely of a plurality of applicators 18, each containing a different colored ink from the other. Any suitable container 25 may be used to contain the applicators 18.

The invention thus provides a relatively simple and inexpensive technique for changing the appearance of an otherwise inexpensive gem stone to the appearance of an expensive gem stone.

Further, the invention provides a technique which allows a base inexpensive gem stone to have its appearance changed from time to time to one of a plurality of different colored expensive gem stones.

Further, the invention provides a technique for a jeweler to be able to demonstrate the appearance of previous gem stones using inexpensive clear crystalline substrates.

Still further, the invention provides a technique for a person to color an inexpensive gem stone to simulate the appearance of an expensive gem stone and to be able to change the chosen color from time-to-time.

What is claimed is:

1. In combination a clear crystalline substrate having a top surface with a plurality of facets thereon to impart a brilliance thereto; and a coating of a permanent transparent coloring medium adhered to said facets to impart the appearance of a colored precious stone to said substrate.

2. The combination as set forth in claim 1 wherein said substrate is a cubic zirconia.

3. In combination a clear crystalline substrate having a plurality of facets thereon to impart a brilliance thereto; and a coating of a permanent transparent coloring medium adhered to said facets to impart the appearance of a colored precious stone to said substrate, wherein said coloring medium is made of n-propanol, n-butanol and diacetone alcohol.

4. In combination a clear crystalline substrate having a plurality of facets thereon to impart a brilliance thereto; and a coating of a permanent transparent coloring medium adhered to said facets to impart the appearance of a colored precious stone to said substrate, wherein said coating is soluble in a solution having isopropyl alcohol 99% strength to permit removal of said coating from said substrate.

5. In combination, a clear crystalline gem stone having a top faceted surface; and a transparent coating of predetermined color permanently adhered to said faceted surface whereby natural light entering through said coating into said stone is colored and reflected around and inside said stone and then reflected back out from said stone in said predetermined color.

6. The combination as set forth in claim 5 wherein said gem stone is selected from one of a diamond, a cubic zirconia and a white sapphire.

7. In combination, a clear crystalline gem stone having a faceted surface; and a transparent coating of transparent ink of predetermined color permanently adhered to said faceted surface whereby natural light entering through said coating into said stone is colored and reflected around and inside said stone and then reflected back out from said stone in said predetermined color.

8. The combination as set forth in claim 7 wherein said ink is comprised of n-propanol, n-butanol and diacetone alcohol.

9. A method of simulating the appearance of an expensive gem stone comprising the steps of providing a clear crystalline substrate having a plurality of facets for reflecting natural light passing into the substrate; and applying a coating of a colored permanent transparent ink to a surface of said substrate, said coating being of a thickness to color natural light passing into the substrate whereby colored light passing into the substrate is reflected within and passed out of the substrate to provide a visual appearance of a colored precious gem stone.

10. A method as set forth in claim 9 wherein the substrate is selected from the group consisting of diamond, cubic zirconia and yellow sapphire.

11. A method as set forth in claim 10 wherein said ink has a color selected from the group consisting of green, red, blue and yellow.

* * * * *

UNITED STATES PATENT AND TRADEMARK OFFICE

CERTIFICATE OF CORRECTION

PATENT NO. : 6,146,723

ISSUED : November 14,2000

INVENTOR(S) : RONALD W. ARENDS

It is certified that this error appears in the above-identified patent and that said Letters Patent is hereby corrected as shown below:

Column 1, line 22 change "or" to -of-

Column 2, line 17 change "comers" to -corners-

Column 3, line 36 change "satiably" to -suitable-

Column 4, line 39 change "surface" to -surfaces-

Column 5, line 14 change "color. Enhancing" to -color enhancing-

Signed and Sealed this

Twenty-second Day of May, 2001

Attest:

NICHOLAS P. GODICI

Attesting Officer

*Acting Director of the United States Patent and Trademark Office*